US010005455B2

(12) United States Patent
Hultén et al.

(10) Patent No.: US 10,005,455 B2
(45) Date of Patent: Jun. 26, 2018

(54) METHOD IN ORDER TO CONTROL VEHICLE BEHAVIOUR

(71) Applicant: Sentient Sweden Ekonomisk Förening, Göteborg (SE)

(72) Inventors: Johan Hultén, Göteborg (SE); Jochen Pohl, Partille (SE)

(73) Assignee: Sentient AB, Göteborg (SE)

( * ) Notice: Subject to any disclaimer, the term of this patent is extended or adjusted under 35 U.S.C. 154(b) by 56 days.

(21) Appl. No.: 15/029,435

(22) PCT Filed: Oct. 15, 2014

(86) PCT No.: PCT/SE2014/051218
§ 371 (c)(1),
(2) Date: Apr. 14, 2016

(87) PCT Pub. No.: WO2015/057147
PCT Pub. Date: Apr. 23, 2015

(65) Prior Publication Data
US 2016/0272197 A1    Sep. 22, 2016

(30) Foreign Application Priority Data
Oct. 16, 2013    (SE) ........................ 1300652

(51) Int. Cl.
| B60W 30/02 | (2012.01) |
| B62D 6/00 | (2006.01) |
| B60T 8/1755 | (2006.01) |
| B60W 30/045 | (2012.01) |
| B60W 10/18 | (2012.01) |
| B60W 10/20 | (2006.01) |
| B62D 5/04 | (2006.01) |

(52) U.S. Cl.
CPC ........... *B60W 30/02* (2013.01); *B60T 8/1755* (2013.01); *B60W 10/18* (2013.01); *B60W 10/20* (2013.01); *B60W 30/045* (2013.01); *B62D 5/0463* (2013.01); *B62D 6/003* (2013.01); *B62D 6/008* (2013.01); *B60T 2210/13* (2013.01); *B60T 2260/02* (2013.01); *B60W 2510/202* (2013.01)

(58) Field of Classification Search
CPC ...... B60W 30/02; B60W 10/18; B60W 10/20; B60W 30/045; B60W 2510/202; B60T 8/1755; B60T 2210/13; B60T 2260/02; B62D 5/0463; B62D 6/003; B62D 6/008
See application file for complete search history.

(56) References Cited

FOREIGN PATENT DOCUMENTS

EP    2112053 A1    10/2009

OTHER PUBLICATIONS

EPO, Int'l Search Report in PCT/SE2014/051218, dated Jan. 15, 2015.

*Primary Examiner* — Michael D Lang
(74) *Attorney, Agent, or Firm* — Piedmont Intellectual Property

(57) ABSTRACT

A method in controlling a steering assistance actuator in a steering system (100) of a vehicle and one or more controllable vehicle state actuators so that the steering-wheel torque applied by the driver is an indicative for the driver intention and transformed to a target yaw and/or lateral vehicle state to be controlled by one or more vehicle state controllers and actuated by the vehicle state actuators along with the fact that the level of understeer is used to achieve an additional steering-wheel torque in the form of a ramp in the steering-wheel torque as a function of the level of understeer.

14 Claims, 4 Drawing Sheets

METHOD IN ORDER TO CONTROL VEHICLE BEHAVIOUR

TECHNICAL FIELD

The present invention relates to a yaw stability control method for a vehicle equipped with electric power assisted steering. Furthermore, the present invention relates to a yaw stability control method comprising hardware and software of a vehicle equipped with electric power assisted steering.

BACKGROUND OF THE INVENTION

Several vehicle control systems, often and normally but not always interconnected in the form of more or less standardised components, which are used to augment the driving capability of a vehicle operator, currently exist. Those control systems include Anti-lock Braking Systems (ABS), Traction Control Systems (TCS), and Yaw Stability Control (YSC) systems. Examples of YSC systems occur under the names: Electronic Stability Control (ESC) systems, Electronic Stability Program (ESP) systems or Dynamic Stability and Traction Control (DSTC) systems.

The yaw stability control systems are utilised to maintain controlled and stable vehicle operations for improved vehicle and occupant safety. The stability control systems are often used to maintain control of a vehicle following a target travel direction, to prevent the vehicle from skidding and help the driver maintain directional stability when cornering. This function is enabled through the brake system by braking one or more of the individual wheels if a lateral skid is detected.

More specifically, the above hitherto known yaw stability control systems typically compare the target direction of a vehicle based upon the steering-wheel angle and the path of travel, which is determined from motion sensors located on the vehicle. By controlling the amount of braking at each corner of the vehicle and the traction force of the vehicle, the target path of travel can be maintained within certain limits.

Traditional yaw stability control systems are designed to correct undesired vehicle motion caused by a tyre force disturbance, such as a tyre force difference due to a road surface disturbance or due to a mismatch between the driving intention of a driver and a road surface condition. This mismatch usually happens when the front and the rear lateral tyre forces respectively deviates from the nominal ones (referred to as the lateral tyre force difference), or there is a difference between the right and the left longitudinal tyre forces respectively (referred to as the longitudinal tyre force difference), or a combination thereof. Such tyre force differences are called tyre force disturbances.

Traditional yaw stability control systems are controlling the vehicle motion in situations where there are disturbances such as the afore-mentioned tyre force disturbances. The thus known yaw stability control systems activate brakes, reduce engine torque, or vary the driving torque at individual wheels or axles so as to generate an active tyre force difference to counteract the effect of the tyre force disturbance. That is, the control mechanism and the vehicle disturbance are from the same source, the tyre force differences.

For example, when a vehicle is driven at a high speed to negotiate a curve, the vehicle could saturate its front tyre cornering forces such that there is a front-to-rear tyre lateral force difference. Such a tyre force disturbance will generate a yaw moment disturbance, which causes the vehicle to steer less than that requested by the driver. This is referred to as an understeer situation. When the traditional yaw stability control systems are used, e.g. the rear inside wheel is braked to add a longitudinal force to generate a yaw moment to counteract the yaw moment disturbance generated by the tyre force disturbance due to the front-to-rear tyre lateral force difference.

However, this brake intervention is usually performed as a function of a yaw rate error, where the yaw rate error is determined as the difference between a yaw rate target and a sensed yaw rate. The yaw rate target is calculated from a steering-wheel angle, and the vehicle velocity using a single-track vehicle model, a so-called bicycle model. This bicycle model is nonlinear in terms of a tyre-to-road friction compensation of the parameters of the model. Therefore, such yaw stability control is closely coupled to the steering-wheel angle, which is to be considered as an indicative of the driver intent.

Another aspect of vehicle stabilisation is that experienced drivers are sensitive to a torque feedback in the steering wheel. The feedback the experienced driver uses is based on the fact that the pneumatic trail, i.e. the distance between the centre of the tyre-to-road contact and the resultant of the side force of the tyre, will decrease as the tyre-to-road friction gets close to its peak friction. Furthermore, the lateral side force on the tyre will saturate as the tyre-to-road friction gets close to the before-mentioned peak friction. As a result of the pneumatic trail and the saturation of the side force, the steering wheel torque will decrease before the position where the peak friction is located. Using this information, provided through the steering wheel, the experienced driver can perform compensatory steering in order to utilise the tyre-to-road friction in an optimal way on the front axle. Such a compensatory steering is beneficial in vehicles without traditional yaw stability control systems, as the peak friction therefore will be fully utilised at the front axle.

However, such driving, where the front axle tyre-to-road peak friction is sought, together with the fact that the steering-wheel angle is used to calculate the target vehicle yaw rate will result in small yaw rate errors in the yaw stability control system, usually below a threshold of the yaw stability control system, wherefore no yaw stability control intervention will be performed by the yaw stability control system. As a consequence thereof the rear axle tyre-to-road friction of the vehicle will not be used in an optimal way.

The consequence of the two afore-mentioned aspects of vehicle motion stabilisation, namely the experienced drivers sought for the front axle peak tyre-to-road friction and the usage of the steering-wheel angle as an indicative of the driver intent, is a conflict between the optimal use of the front axle peak tyre-to-road friction and the rear axle tyre-to-road friction. Both axles cannot be optimally used at the same time.

One of the problems with traditional yaw stability control is the usage of the steering-wheel angle as an indicative for the target vehicle yaw rate. Research with joystick based steering has shown that force feedback is necessary in order not to make the driver-vehicle control loop unstable. It is also so that when skidding, it is via the steering-wheel torque feedback information the vehicle can be controlled by the driver, not the steering-wheel angle. The before-mentioned conflict between the optimal tyre-to-road friction and the usage of the steering-wheel angle as an indicative of the driver intent can be avoided by the use of the steering-wheel torque as an indicative of the driver intent.

According to one aspect of the present invention, it is an object to control a steering assistance actuator in a steering system to a vehicle and one or more controllable vehicle state actuators by the use of a measurement of at least one input signal with the aid of a sensor and from that sensor value determine a measure of a torque applied by the driver via a steering wheel. This measure of a torque applied by the driver via a steering wheel is transformed to a target yaw and/or lateral vehicle state whereby the mentioned target yaw and/or lateral vehicle state is used as a reference signal to one or more controllers for the mentioned control of one or more vehicle state actuators, such as the brakes, the engine, the four-wheel-drive clutches, the differentials etcetera.

According to another aspect of the present invention, it is an object to build a steering-wheel torque ramp so that the steering-wheel torque will increase without a steering-wheel angle greater than the optimal for reaching the front axle peak friction.

Combining these two aspects of the present invention will result in both optimal utilisation of the front axle friction and a very effective vehicle yaw rate control.

The following four scenarios can beneficially further illustrate important benefits with the present invention:

One common accident occurs as a result of aquaplaning. In aquaplaning situations, the driver tries to steer the vehicle when there is no tyre-to-road friction that can be used to steer the vehicle, resulting in a great steering-wheel angle, but no vehicle steering. Such a great steering-wheel angle in combination with the fact that the driver is not intending to steer the vehicle according to that great steering-wheel angle will, as the aquaplaning ends, and the tyre-to-road friction is back again, potentially result in a crash or road departure. With the present invention, the driver will have a torque ramp and when the torque corresponding to the normal curve negotiating torque is reached, the steering wheel will find its equilibrium position. After the aquaplaning area, the steering-wheel torque will result in the desired curve negotiation.

Another common accident type occurs owing to the low friction that often occurs at the roadside, just outside the asphalt area. This is often made worse by a steep asphalt edge drop-off. Drivers who slip off a road onto a shoulder are likely to lose control as they attempt to climb back onto the roadway. The edge drop-off creates a "scrubbing" condition that a driver must overcome by excessive steering. As drivers tend to apply an excessive steering to re-enter the roadway, they are prone to lose control of the vehicle. This may cause the car to veer into the adjacent lane, where it may collide or sideswipe oncoming cars, overturn, or run off the road and crash. This invention will prevent the driver from excessive steering, as well as to produce a target value for the vehicle state actuators so that the vehicle is controlled back on to the roadway without any excessive steering.

Yet another important scenario is tyre explosions or punctures. In the case of e.g. a front axle tyre loosing its air, the capability of carrying lateral forces diminishes, and hence, the vehicle will steer less than intended. In such a situation, the vehicle is again controlled back on to the roadway without any excessive steering.

Finally, one situation that occurs under highly dynamic driving conditions, such as severe lane-change manoeuvres, is that the driver loses control over the vehicle. Some detail for this scenario is that there is a very rapid transfer from vehicle understeering to vehicle oversteering. When the driver starts to steer in the severe manoeuvre, the driver tends to apply an excessive steering to avoid e.g. an obstacle. The excessive steering will result in a vehicle yaw acceleration, that sometimes will integrate up to a great vehicle yaw rate resulting in an oversteer situation. At the point of this transition between understeer and oversteer, the steering-wheel angle will be far greater than the driver would intend it to be, resulting in a relatively large time delay before the driver actually steers into the adjacent lane. The present invention inhibits the initial excessive steering, but with maintained vehicle yaw control by the vehicle state actuators, and thus minimising the time delay it takes to steer back in to the adjacent lane.

Further embodiments are listed in the specific description as well as in the dependent claims.

It will be appreciated that features of the invention are susceptible to being combined in any combination without departing from the scope of the invention as defined by the accompanying claims.

BRIEF DESCRIPTION OF THE DRAWINGS

By way of example only, embodiments of the present invention will now be described with reference to the accompanying drawings wherein.

Figure 1:
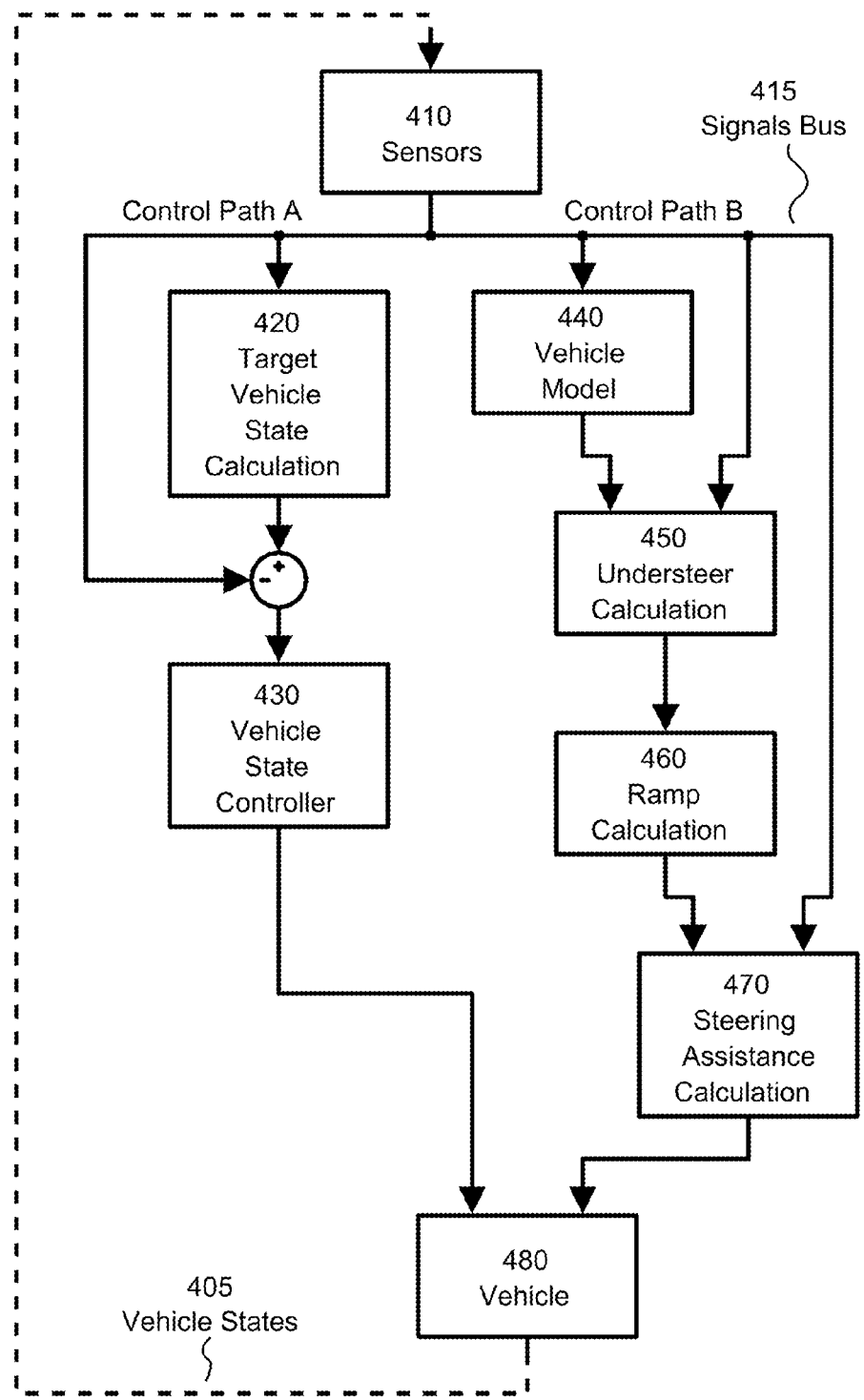
FIG. 1 is a schematic figure showing a control diagram for the control of the yaw and/or lateral vehicle state.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims and the description as a whole. It should be further understood that the drawings are not necessarily drawn to scale and that, unless otherwise indicated, they are merely intended to conceptually illustrate the structures and procedures described herein. The same reference numerals are used for illustrating corresponding features in the different drawings.

According to FIG. 1, a schematic figure shows a control scheme over several control steps. A vehicle (480), with its several subsystems, has at every time a number of states, where a state is defined as a translational or rotational position, velocity or acceleration. These states are schematically represented by a dashed line (405). The vehicle (480) is equipped with a series of sensors (410) for direct or indirect measurements of the vehicle states. Several sensors can be used such as a torsion-bar torque sensor, a steering-wheel angle sensor, vehicle wheel speed sensors, a vehicle yaw rate sensor, a vehicle lateral acceleration sensor or a cluster of vehicle velocities and rotational speeds. The sensed or measured values of the vehicle states (405) are communicated to the control steps by the use of a signal bus (415), where a signal bus is a transmission path on which signals can be read and/or transmitted. For the control of the vehicle (480), there are two control paths (A, B) namely a vehicle state control path (A) indicated by (410)-(420)-(430)-(480) and a steering system assistance control path (B) indicated by (410)-(440)-(450)-(460)-(470)-(480). Firstly, the vehicle state control path (A) contains a target vehicle state calculation (420), which is further illustrated in FIG. 2, resulting in a target vehicle state.

Figure 2:
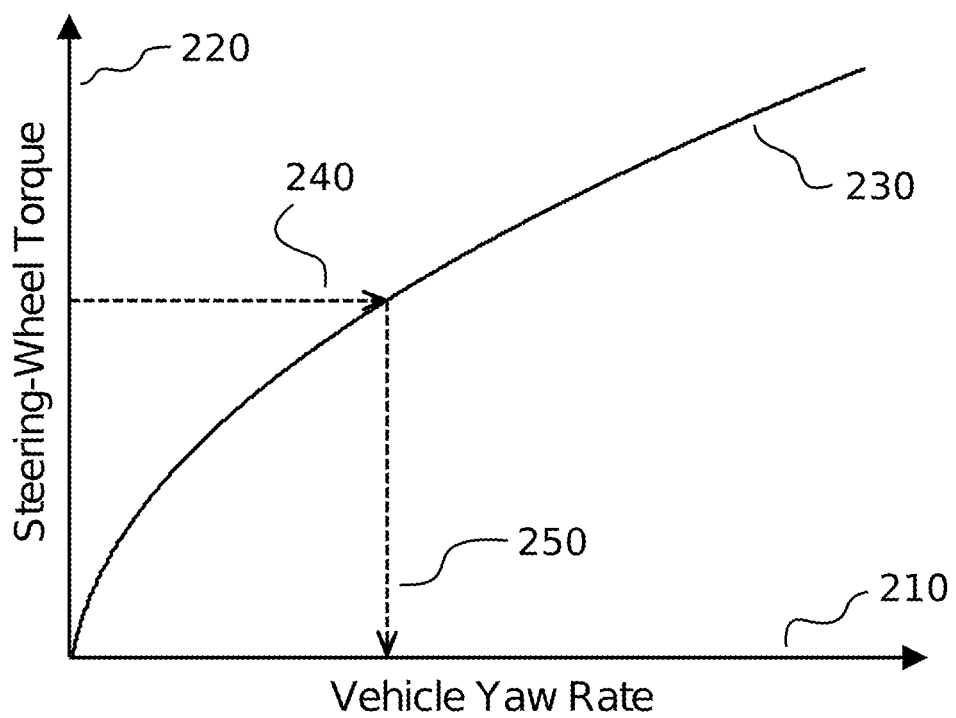
FIG. 2 is a schematic figure showing the relation between the vehicle yaw rate and the steering-wheel torque.

The target vehicle state calculation box (420) can be made such that a steering-wheel torque in FIG. 2 is a measure of a torque applied by the driver via a steering wheel compensated by a compensation torque. The reason for this is that the steering-wheel torque contains several torque parts, namely the to the before-mentioned vehicle state related torque, but also a friction torque owing to the friction between the tyres and the road, a friction torque of the steering system owing to the friction of the parts of the linkage of the steering system, a damping torque owing to damping of the tyres and the steering system and a returnability torque that comes from the geometry of the steering system. This compensation torque is the sum of the abovementioned tyre friction torque, the friction torque, the damping torque and the returnability torque. The parts of the compensation torque are calculated from mathematical models of the different torque parts.

The mathematical model of the tyre friction torque is a model of an angle or angular speed driven hysteresis. The mathematical model of the tyre also contains a relaxation part such that as the tyre rolls, the torque of the hysteresis will have a relaxation length so that the hysteresis torque decreases with the rolling length of the tyre. The relaxation can preferably be the well-known half-life exponential decay function. The model of the tyre friction is the combination of the hysteresis and the relaxation so that e.g. an increase owing to the hysteresis torque can happen at the same time as the torque decrease owing to the relaxation. The resulting torque of the model is the sum of the two parts.

The mathematical model of the friction torque is a model of an angle or angular speed driven hysteresis. The maximum torque in the hysteresis can be shaped by a function so that the maximum torque is different on centre compared to off centre.

The mathematical model of the damping torque consists of a damping constant times an angular speed or translational speed, such as e.g. a rack velocity, measured somewhere in the linkage between the road wheels and the steering wheel. The damping constant can be such that the damping has a blow-off, such that the damping constant decreases for great angular or translational speeds. The damping constant can be vehicle speed dependent as well as different for steering outwards compared to inwards. The damping constant can also be a function of the steering-wheel or torsion-bar torque.

The returnability torque is a vehicle speed dependent and steering-wheel angle dependent torque.

The calculation of a vehicle state control error is the difference between a target vehicle state and a measurement of the same vehicle state. A vehicle state controller (430) is defined as a dynamic function for achieving a target state in a vehicle (480) in a controlled manner. The vehicle state controller or controllers, in the case of several controllers controlling several vehicle state actuators, are responsible for calculating target values for the vehicle state actuators in the vehicle (480). A vehicle state actuator is an actuator that when actuated influences one or several vehicle states. Vehicle state actuators are brakes, engine, controllable four-wheel-drive clutches, controllable differentials, active dampers, electric or hydraulic wheel motors and electrically or hydraulically driven axles. An actuator is a mechanism or system that is operated by an ECU and converts a source of energy, typically electric current, hydraulic fluid pressure, or pneumatic pressure, into a motion, force or torque. Controlability describes the ability of an external target value to move the internal state of a system from any initial state to any other final state in a finite time interval. A target value, reference value or request is a set point for the actuator, and a control error is the difference between the target value and the actual value, and the aim of the controller is to minimise this control error and hence achieving the target value in a controlled manner. By the use of the steps (420)-(430), the vehicle is controlled to the target vehicle state.

The steering system assistance control path (B) consists of a vehicle model (440), which is a mathematical model that transforms a road-wheel angle and a vehicle speed to a number of vehicle yaw and/or lateral states, namely vehicle yaw rate and acceleration, vehicle lateral speed and acceleration and vehicle body sideslip angle. The states calculated in the vehicle model (440) are used in an understeer calculation (450), where understeer is defined as the situation where the vehicle steers less than the steering indicated by the vehicle model. The level of understeer calculated in the understeer calculation (450) is a transformation from the vehicle model states and the measured states to the level of understeer. A transformation is defined as a mathematical function or lookup table with one or more input values used to produce one or more output values. In a ramp calculation (460), there is a transformation between the level of understeer to a torque ramp (350, see FIG. 3) value, which is an additional steering-wheel torque to be added to a base steering-wheel torque. A steering-wheel torque measurement is a torque measured in the steering column or steering wheel or a force measured in the steering rack times the torque ratio between the steering rack and the steering wheel. A base or normal steering-wheel torque is a torque that would occur without a torque ramp. In a steering assistance calculation (470), the steering assistance is calculated so that the resulting steering-wheel torque is a sum of a base steering-wheel torque and an additional torque ramp. An additional torque can be added to a base torque by the use of a delta steering-wheel torque interface such that the assistance will result in the steering-wheel torque sum. Such a delta torque interface is for e.g. a boost curve control with a dual torque injection. In such a dual torque injection, the delta steering-wheel torque is added both before and after the boost curve, and hence, the boost curve is moved along a line with a gradient of minus one so that the delta steering-wheel torque shifts the equilibrium position. The level of assistance and the torque applied by the driver to the steering wheel will result in a steering-wheel angle (310), which will serve as an input to the behaviour of the vehicle (480). A steering-wheel angle is here referred to as any angle between the steering wheel and the road wheel times the ratio between the angular degree of freedom and the steering-wheel angular degree of freedom. It can also be a rack position times its ratio between the rack translational degree of freedom to the steering-wheel angular degree of freedom.

Another delta steering-wheel torque interface is the addition of a delta torque to the reference torque value of a torque reference generator. A torque reference generator is a steering feel control concept where the steering-wheel torque is calculated in a reference generator, and this reference steering-wheel torque is then compared to a measured steering-wheel torque and the difference, the steering-wheel torque error, is fed to a controller so that this error is minimised.

A third delta steering-wheel torque interface is the addition of a delta torque to the compensation torque value of an angle reference generator. An angle reference generator is a steering feel control concept where the steering-wheel angle is calculated in a reference generator, and this reference steering-wheel angle is then compared to a measured steering-wheel angle and the difference, the steering-wheel angle error, is fed to a controller so that this error is minimised.

According to FIG. 2, a schematic figure shows the relation between a vehicle yaw rate (210) on the abscissa and a steering-wheel torque (220) on the ordinate. A solid line (230) therein corresponds to a reference relation between the vehicle yaw rate and the steering-wheel torque. A dashed line (240) corresponds to how a steering-wheel torque is used to achieve a working point on the reference relation between the vehicle yaw rate and the steering-wheel torque. A dashed line (250) corresponds to how a working point on the reference relation between the vehicle yaw rate and the steering-wheel torque is used to achieve a target vehicle state, which in this figure is represented by a vehicle yaw rate. A steering-wheel torque is by the before-mentioned dashed line (250) transformed to a target yaw and/or lateral vehicle state.

Figure 3:
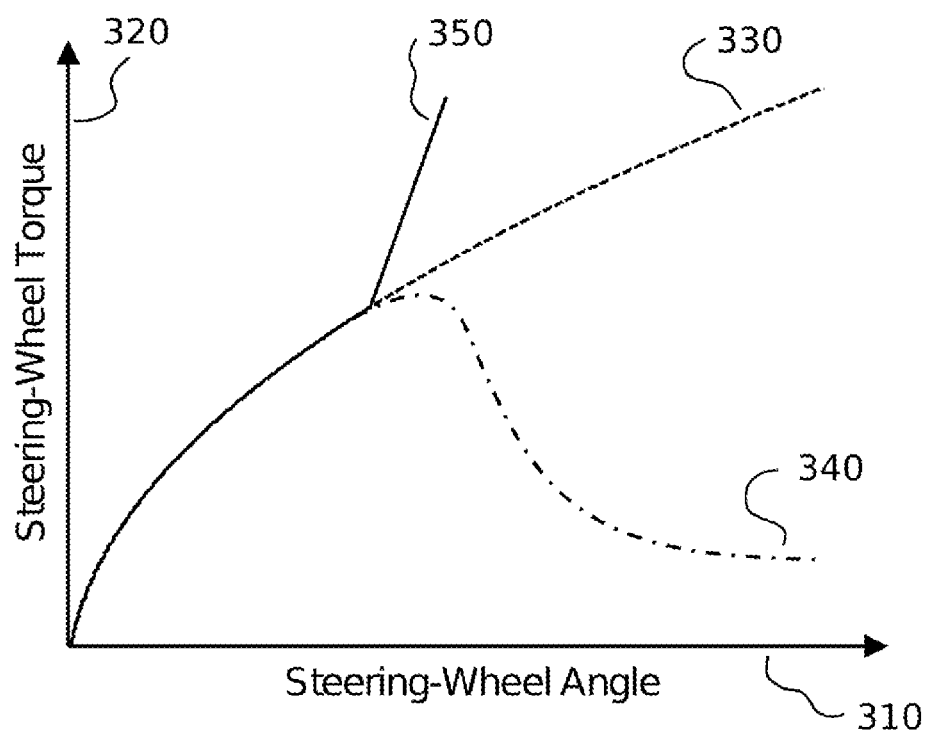
FIG. 3 is a schematic figure showing the relation between the steering-wheel angle and the steering-wheel torque.

FIG. 3 shows a schematic figure of the relation between a steering-wheel angle (310) on the abscissa and a steering-wheel torque (320) on the ordinate. A dashed line (330) in the figure corresponds to the situation where the tyre-to-road friction is not fully utilised, while a dash-dotted line (340) corresponds to the situation where the tyre-to-road friction is fully utilised, i.e. reaches its peak friction. When the tyre-to-road friction is fully utilised, the pneumatic trail, which is the distance between the centre of the tyre-to-road contact and the resultant of the side force of the tyre, will decrease. Furthermore, the lateral side force on the tyre will saturate as the tyre-to-road friction gets close to the before-mentioned peak friction. As a result of the pneumatic trail and the saturation of the side force, the steering wheel torque will decrease before the position where the peak friction is located. The solid line corresponds to the situation where there is a ramp function (350) in the relation between the steering-wheel angle and the steering-wheel torque. A ramp function is a transformation between the level of understeer and the level of additional steering-wheel torque.

Figure 4:
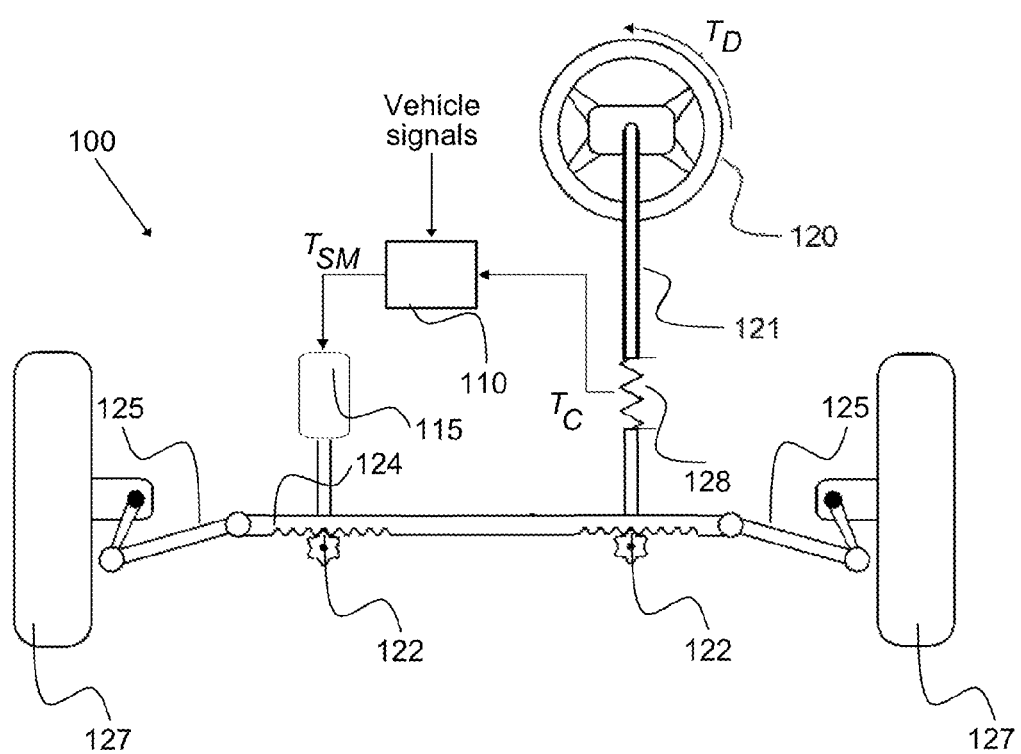
FIG. 4 is a schematic figure showing a steering system for power assisted vehicle steering.

FIG. 4 is a schematic figure of a steering system (100). In a power assisted steering system of a vehicle there is a linkage between the front axle road wheels (127) and the steering wheel (120). The linkage consists of a steering rack (124) with associated tie rods (125) connected via a pinion (122) to the steering column (121). The steering column (121) incorporates a torsion bar (128) with a torque sensor for measuring the steering torque applied by the driver. The assistance torque is actuated by a steering assistance actuator, which consists of an assistance motor (115) and an ECU (110). The control of the level of assistance actuation in the steering assistance actuator is controlled by a control system in the ECU.

DETAILED DESCRIPTION OF PREFERRED EMBODIMENTS

The present invention is based on the fact that the torque in the torsion bar (128), that is sensed by the sensors (410) and sent via the signal bus (415), is used and transformed in a series of steps according to FIG. 1:

1. In a first step, the torsion-bar torque is transformed, according to FIG. 2, to the target vehicle state by the use of a calculation function in the target vehicle state calculation (420). Note that FIG. 2 shows the vehicle state yaw rate, where it for the invention can be a target yaw, lateral and/or sideslip angle vehicle state.
2. The to the target vehicle states corresponding sensed vehicle states are in a second step, compared to the target vehicle states as the difference between the latter and the former to form the vehicle state control error.
3. This control vehicle state error is in a third step fed to a vehicle state controller, (430), where the vehicle state control error is minimised. In this preferred embodiment, the vehicle state controller is the brake controller, where the vehicle state control error can either be used directly by a rule based controller or by first transforming it to a target vehicle yaw torque, and then to target values for brake torques of the individual road wheels.
    In an understeer situation, the front axle side forces are saturated and therefore, the yaw torque should preferably be transformed to target brake torques of the rear axle only. To achieve a yaw torque by using the brakes of the rear axle, the brake distribution between the two wheel brakes can be made in several ways, where one is to brake the inner rear wheel only, and another is to add a brake torque to the outer wheel as well in such a way that the target yaw torque is fulfilled. In the case of several rear axles, distribution between all of the rear axle brakes should be made.
4. The controller requests are in a fourth step actuated by the actuators in the vehicle (480) so that the target vehicle state, as good as possible by the limitations of the system, is reached. The resulting vehicle behaviour is sensed by the sensors (410), thereby closing the left path of FIG. 1.

As a parallel path to the vehicle state control path (A) from (410), via (420), and (430) to (480), the steering state control path (B) exists. The steering-wheel angle is sensed by the sensors (410).

5. This steering-wheel angle is in a fifth step fed to the vehicle model in (440), where the vehicle yaw and/or lateral state is calculated. The vehicle model is in this embodiment the to a person skilled in the art well-known bicycle model.
6. In a sixth step, the understeer calculation (450), the calculated vehicle yaw and/or lateral state is together with the sensed vehicle yaw and/or lateral state used to calculate the level of understeer. In this embodiment of the present invention, the level of understeer is the difference between the measured vehicle yaw and/or lateral vehicle state and the corresponding one calculated in the vehicle model.
7. In a seventh step, the level of understeer is in the ramp calculation (460) transformed to the additional steering-wheel torque to be added to the base steering-wheel torque. The additional steering-wheel torque is a function of the level of understeer.
8. In an eighth step, the additional steering-wheel torque is in the steering assistance calculation (470) used with the delta steering-wheel torque interface to achieve the steering assistance such that the steering-wheel torque is the base steering-wheel torque with the addition of the delta steering-wheel torque. In this embodiment of the present invention, the delta torque interface is a dual torque injection used in combination with a boost curve control of the steering feel assistance.
9. In the final ninth step, the control of the assistance together with the fact that the driver is in the control loop, results in a steering-wheel angle in the vehicle (480). The resulting steering-wheel angle is sensed by the sensors (410), thereby closing the right path of FIG. 1.

Combining the vehicle state control path (A) to the steering state control path (B) results in the fact that the force applied to the steering wheel by the driver will result in a steering-wheel torque that firstly will give a limited steering-wheel angle such that the front axle tyre-to-road friction is fully utilised. The steering-wheel torque will also be used in the vehicle state control path to control the vehicle yaw and/or lateral states. Therefore, the result of the invention is that the front axle tyre-to-road friction is fully utilised at the same time as the vehicle yaw and/or lateral vehicle states are controlled.

In a second preferred embodiment of the present invention, step 1 is in comparison to embodiment 1 altered in such a way that the steering-wheel torque in FIG. 2 is a measure of a torque applied by the driver via the steering wheel compensated by a compensation torque.

This first step of the second embodiment is used together with the other steps from the first embodiment, whereby all steps necessary for the invention also in this embodiment is described, and again, the result of the invention is that the front axle tyre-to-road friction is fully utilised at the same time as the vehicle yaw and/or lateral vehicle states are controlled.

In a third preferred embodiment of the present invention, step 3 is in comparison to embodiment 1 altered in such a way that the number of controllers is not limited to only one controller as depicted as (430) in FIG. 1. Several controllers, e.g. one for every actuator used in the control of the vehicle stability, can be used. In this embodiment of the invention one controller for every vehicle state actuator is used. The vehicle state control error can either be used directly by rule based controllers or by first transforming it to a target vehicle yaw torque, to be used by the different controllers.

This third step of the third embodiment can be used together with the full set of permutations of all of the other steps from all of the previously described embodiments, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

In a fourth preferred embodiment of the present invention, step 3 is in comparison to the first embodiment altered in such a way that several vehicle state actuators are used in combination with only one controller (430). The vehicle state control error is first transformed to a target vehicle yaw torque. This yaw torque is distributed to the different vehicle state actuators. The distribution can be made by the use of e.g. control allocation or any other control method for over-actuated systems. The vehicle state error is minimised by e.g. the control allocation controller. Over-actuated systems are systems with more actuators than degrees of freedom to be controlled.

This third step of the third embodiment can be used together with the full set of permutations of all of the other steps from all of the previously described embodiments, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

In a fifth preferred embodiment of the present invention, step 5 is in comparison to the first embodiment altered in such a way that a, to a person skilled in the art well-known, two-track vehicle model (440) is used. Such a model is more advanced and includes among others lateral load transfer. Such load transfer is important in situations where the tire load capabilities is of importance, as they are at limit handling situation such as understeer.

This fifth step of the fifth embodiment can be used together with the full set of permutations of all of the other steps from all of the other previously described embodiments, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

In a sixth preferred embodiment of the present invention, step 6 is altered in such a way that the level of understeer, in the understeer calculation (450), is the difference between the measured vehicle yaw and/or lateral vehicle state and the corresponding one calculated in the vehicle model times a vehicle velocity dependent weighting function.

This sixth step of the sixth embodiment can be used together with the full set of permutations of all of the other steps from all the previously described embodiments, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

In a seventh preferred embodiment of the present invention, step 6 is altered in such a way that the level of understeer, in the understeer calculation (450), is a relative difference, such that it is calculated as the difference between the measured vehicle yaw and/or lateral vehicle state and the corresponding one calculated in the vehicle model divided by the corresponding measured or calculated one or a linear combination thereof.

This sixth step of the seventh embodiment can be used together with the full set of permutations of all of the other steps from all of the previously described embodiments, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

In an eighth preferred embodiment of the present invention, step 7 is altered in such a way that the level of understeer is used in (460) for the transformation to the additional steering-wheel torque to be added to the base steering-wheel torque such that the ramp function is steering-wheel angle driven. The ramp function starts at a critical steering-wheel angle where the level of understeer is greater than a critical level of understeer and increases as a function of the difference between the current steering-wheel angle and the critical one.

This seventh step of the eighth embodiment can be used together with the full set of permutations of all of the other steps from all of the previously described embodiments, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

In a ninth preferred embodiment of the present invention, step 7 is altered in such a way that the level of understeer is used in the ramp calculation (460) for the transformation to the additional steering-wheel torque to be added to the base steering-wheel torque such that the ramp function is a linear combination of a function of the level of understeer and a function that starts at the critical steering-wheel angle where the level of understeer is greater than a critical level of understeer and increases as a function of the difference between the current steering-wheel angle and the critical one.

This seventh step of the ninth embodiment can be used together with the full set of permutations of all of the other steps from all of the previously described embodiments, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

In a tenth preferred embodiment of the present invention, step 8 is altered in such a way that the additional steering-wheel torque is in the steering assistance calculation (470) added to the steering-wheel reference torque of a torque reference generator.

This eighth step of the tenth embodiment can be used together with the full set of permutations of all of the other steps from the previously described embodiments, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

In an eleventh preferred embodiment of the present invention, step 8 is altered in such a way that the additional steering-wheel torque is in the steering assistance calculation (470) added to the compensation torque of an angle reference generator.

This eighth step of the eleventh embodiment can be used together with the full set of permutations of all of the other steps from all of the earlier embodiments as previously described, whereby all steps necessary for the invention also in this embodiment is fully described in all its combinations, and again, the result of the invention is that the front axle tyre-to-road friction is fully utilised at the same time as the vehicle yaw and/or lateral vehicle states are controlled.

The invention claimed is:

1. A method of controlling a steering system of a vehicle and at least one controllable vehicle state actuator of the vehicle, the steering system having a base steering-wheel torque and a steering assistance actuator, the method comprising:
    generating at least two input signals with respective sensors, wherein the sensors include a torsion-bar torque sensor, a steering-wheel angle sensor, vehicle wheel-speed sensors, and a vehicle yaw-rate sensor;
    determining a level of vehicle understeer based on the at least two input signals;
    determining a steering-wheel torque ramp based on the level of vehicle understeer;
    determining, from at least one of the at least two input signals, a measure of a torque applied by a vehicle driver via a steering wheel;
    controlling the steering assistance actuator based on a reference signal based on a sum of the steering-wheel torque ramp and the base steering-wheel torque, thereby preventing the vehicle driver from excessive steering;
    determining a target yaw and/or lateral vehicle state based on the measure of the torque applied by the vehicle driver via the steering wheel; and
    determining a reference signal for at least one of the controllable vehicle state actuators based on the target yaw and/or lateral vehicle state to control a path of the vehicle, whereby tire-to-road friction and vehicle yaw and/or lateral vehicle state are controlled;
    wherein the target yaw and/or lateral vehicle state is based on the torque applied by the vehicle driver via the steering wheel and on a compensation torque; the compensation torque is based on at least one of a steering system friction torque, a tire-friction torque, a damping torque, and steering-wheel self-alignment torque; and the compensation torque is transformed to a target yaw and/or lateral vehicle state in determining a target vehicle state.

2. The method of claim 1, wherein the level of vehicle understeer is a difference between the target yaw and/or lateral vehicle state and a model yaw and/or lateral vehicle state.

3. The method of claim 1, wherein the at least one controllable vehicle state actuator includes a vehicle brake, and a vehicle brake controller in a vehicle state controller minimizes a difference between a measured yaw and/or lateral vehicle state and the target yaw and/or lateral vehicle state.

4. The method of claim 1, wherein the steering-wheel torque ramp is added to the base vehicle torque by dual torque injection to a boost curve controller.

5. The method of claim 1, wherein controllable vehicle state actuators are controlled by respective controllers in a vehicle state controller that generates a vehicle state control error, and the controllable vehicle state actuators operate based on the vehicle state control error.

6. The method of claim 1, wherein plural controllable vehicle state actuators are controlled by one controller in a vehicle state controller that generates a vehicle state control error, and the plural controllable vehicle state actuators operate based on the vehicle state control error according to an over-actuated system.

7. The method of claim 1, wherein the level of vehicle understeer is a difference between a measured yaw and/or lateral vehicle state and a model yaw and/or lateral vehicle state weighted based on a vehicle velocity.

8. The method of claim 1, wherein the level of vehicle understeer is a relative difference between a measured yaw and/or lateral vehicle state and a model yaw and/or lateral vehicle state normalized by a linear combination of the measured and model yaw and/or lateral vehicle state.

9. The method of claim 1, wherein the steering-wheel torque ramp is related to the level of vehicle understeer such that the ramp starts at a critical steering-wheel angle for which the level of vehicle understeer is greater than a predetermined threshold value of the vehicle and also such that the ramp is related to a difference between a current steering-wheel angle and the critical steering-wheel angle.

10. The method of claim 1, wherein determining the steering-wheel torque ramp includes determining an additional steering-wheel torque based on the level of vehicle understeer, and adding the additional steering-wheel torque and the base steering-wheel torque, whereby the steering-wheel torque ramp is a linear combination of a function of the level of vehicle understeer and a ramp that starts at a critical steering-wheel angle for which the level of vehicle understeer is greater than a critical level and increases as according to a difference between a current steering-wheel angle and the critical steering-wheel angle.

11. The method of claim 10, wherein controlling the steering assistance actuator includes adding the additional steering-wheel torque and a reference steering-wheel torque produced by a torque reference generator.

12. The method of claim 10, wherein controlling the steering assistance actuator includes adding the additional steering-wheel torque and a compensation torque produced by an angle reference generator.

13. The method of claim 1, wherein the level of vehicle understeer is a difference between a measured yaw and/or lateral vehicle state and a yaw and/or lateral vehicle state based on a two-track vehicle model.

14. A non-transitory computer-readable medium having stored therein instructions that, when executed by a computer, cause the computer to carry out a method of controlling a steering system of a vehicle and at least one controllable vehicle state actuator of the vehicle, the steering system having a base steering-wheel torque and a steering assistance actuator, the method comprising:
 generating at least two input signals with respective sensors, wherein the sensors include a torsion-bar torque sensor, a steering-wheel angle sensor, vehicle wheel-speed sensors, and a vehicle yaw-rate sensor;
 determining a level of vehicle understeer based on the at least two input signals;
 determining a steering-wheel torque ramp based on the level of vehicle understeer;
 determining, from at least one of the at least two input signals, a measure of a torque applied by a vehicle driver via a steering wheel;
 controlling the steering assistance actuator based on a reference signal based on a sum of the steering-wheel torque ramp and the base steering-wheel torque, thereby preventing the vehicle driver from excessive steering;
 determining a target yaw and/or lateral vehicle state based on the measure of the torque applied by the vehicle driver via the steering wheel; and
 determining a reference signal for at least one of the controllable vehicle state actuators based on the target yaw and/or lateral vehicle state to control a path of the vehicle, whereby tire-to-road friction and vehicle yaw and/or lateral vehicle state are controlled;
 wherein the target yaw and/or lateral vehicle state is based on the torque applied by the vehicle driver via the steering wheel and on a compensation torque; the compensation torque is based on at least one of a steering system friction torque, a tire-friction torque, a damping torque, and steering-wheel self-alignment torque; and the compensation torque is transformed to a target yaw and/or lateral vehicle state in determining a target vehicle state.

* * * * *